(12) United States Patent
Wang (10) Patent No.: US 7,826,997 B2
(45) Date of Patent: Nov. 2, 2010

(54) METHOD FOR ACQUIRING AND MANAGING MORPHOLOGICAL DATA OF PERSONS ON A COMPUTER NETWORK AND DEVICE FOR CARRYING OUT SAID METHOD

(76) Inventor: Kenneth Kuk-Kei Wang, 6, Green Villa, Lot 251 DD 223, 7-1/2M Clearwater Bay Road, Sai Kung, Kowloon - Hong Kong (CN)

( * ) Notice: Subject to any disclaimer, the term of this patent is extended or adjusted under 35 U.S.C. 154(b) by 546 days.

(21) Appl. No.: 11/597,316

(22) PCT Filed: May 23, 2005

(86) PCT No.: PCT/EP2005/005649
§ 371 (c)(1),
(2), (4) Date: Aug. 23, 2007

(87) PCT Pub. No.: WO2005/114506
PCT Pub. Date: Dec. 1, 2005

(65) Prior Publication Data
US 2009/0204335 A1 Aug. 13, 2009

(30) Foreign Application Priority Data
May 21, 2004 (FR) .................................. 04 05538

(51) Int. Cl.
*G01D 1/00* (2006.01)
(52) U.S. Cl. .................... 702/127; 700/132; 28/241; 28/248
(58) Field of Classification Search .......... 700/130–132; 28/241, 242, 248–251
See application file for complete search history.

(56) References Cited

U.S. PATENT DOCUMENTS

| 4,149,246 A | | 4/1979 | Goldman |
| 5,495,568 A | | 2/1996 | Beavin |
| 5,515,268 A | * | 5/1996 | Yoda ........................... 705/26 |
| 5,930,769 A | | 7/1999 | Rose |

(Continued)

FOREIGN PATENT DOCUMENTS

DE 19620144 11/1997

(Continued)

OTHER PUBLICATIONS

English language abstract of DE 19620144.

*Primary Examiner*—Manuel L Barbee
(74) *Attorney, Agent, or Firm*—William H. Holt (57) ABSTRACT

The invention relates to a method for acquiring and managing morphological data of persons on a computer network, wherein said data is used for producing and/or delivering ready-made individually dimensioned clothes by at least one of the plurality of manufacturers. The inventive method consists, at a preliminary stage, in forming a first data base (3) on human body profiles by storing standard data sizes in a first computer system, in acquiring (6, 10), at a subsequent stage, representative current data of the morphology of said persons by means of a computerized acquisition system and in selecting (5, 8) personal data nearest to current data (6, 9) of each person from standard data. Said method is characterized in that personal data (12) is selected on a second computer system from a second database (4, 7), wherein standard data is organized by size ranges according to each manufacturer.

20 Claims, 6 Drawing Sheets

U.S. PATENT DOCUMENTS

| | | |
|---|---|---|
| 6,490,534 B1 | 12/2002 | Pfister |
| 6,516,240 B2 * | 2/2003 | Ramsey et al. .............. 700/131 |
| 7,039,486 B2 * | 5/2006 | Wang ........................ 700/117 |
| 2001/0030754 A1 | 10/2001 | Spina et al. |

FOREIGN PATENT DOCUMENTS

| | | |
|---|---|---|
| EP | 0838167 | 4/1998 |
| WO | 01/30189 | 5/2001 |
| WO | 2004/008898 | 1/2004 |

* cited by examiner

METHOD FOR ACQUIRING AND MANAGING MORPHOLOGICAL DATA OF PERSONS ON A COMPUTER NETWORK AND DEVICE FOR CARRYING OUT SAID METHOD

TECHNICAL FIELD OF THE INVENTION

The present invention relates to a method and apparatus for acquiring and managing morphological data of persons on a computer network and the use thereof.

TECHNICAL BACKGROUND TO THE INVENTION

It goes without saying that the most important thing when purchasing a garment is that it should "fit properly". This idea of "fit" is both objective and subjective. The objective aspect relies on the notion of size. The subjective side addresses the image which the person has of themselves when they wear the garment.

The taking of measurements by the tailor in earlier times and sessions of trying on in front of a mirror correspond to these two aspects. They are found in the modern versions of the systems put into place by the clothing industry, the aim of which is to provide the "made to measure" quality to the largest possible number of people with the same ease of access as to ready-to-wear garments.

In fact, one of the major drawbacks which the ready-to-wear market has to confront is the management of alterations or the returning of items sold in shops or stores which do not fit. This phenomenon has certainly grown with the development of mail order sales and more recently with the explosion of online buying through the Internet.

American patent U.S. Pat. No. 5,930,769 granted on 27 Jul. 1999 in the name of A. Rose perfectly describes the problem outlined above and proposes a solution to remedy it. The process disclosed in this document makes it possible to generate the structure of a mannequin from the measurements taken by the consumers themselves and a photograph of their face. A size is automatically determined as a future reference. The garment is displayed on a real or virtual stylised mannequin, thus enabling the customer to see the final result in advance.

The main drawback of this process seems to be the fact that the person has to take his/her own measurements. Secondly, the sizing system appears to be simplified to the extreme and does not take account of the different ways in which the apparel brands adjust the ranges of sizes to suit their own criteria. Finally, the representation of the person wearing the garments appears to be highly approximate and not at all realistic as it is purely a front view without any opportunity to check the "fit" of the side view and back view.

The method and system described in American patent U.S. Pat. No. 5,515,268 granted on 7 May 1996 in the name of K. Yoda help to overcome the drawback of the manual inputting of measurements by using optical sensors. The automatic measurements are matched with the morphological data corresponding to sizes in a database. The images of the garments in the size selected are superimposed on those of the person so that he/she can judge the "fit". A device resembling a belt, the length of which is regulated by the system, enables the customer to check physically that the garment size is appropriate to him/her.

This device seeks to make it possible to choose in objective terms, as well as in subjective terms, thanks to the original device of the automatic belt. However, the only measurements taken into consideration in order to judge the "fit" are peripheral measurements such as the measurements around the waist, hips or bust, and these are not enough.

The process described in International application WO 01/30189 in the name of E. Laue and published on 3 May 2001 uses means to create an animation showing the person moving while wearing the garment of his/her choice. This animation is produced from morphological data obtained by three-dimensional measurements of the customer's body surface, stored on a "credit card" type support with an identification code. The morphological data comprise detailed data as to the face and hairstyle. From the identification code the software is capable of selecting from a catalogue the garment corresponding to the measurements and wishes of the person, and of simulating the wearing of the garment and displaying an image of the customer wearing the garment. When the customer is satisfied with the result he/she is able to initiate the process of manufacturing the garment from these same data.

This method appears attractive as it would make use of simulation programs known in the prior art (Ramsis/Antropos). However, the absence of technical details means that it is impossible to determine whether certain crucial problems such as those linked with the different interpretations of sizes and of the "fit" by the different brands have actually been resolved.

The principle of the methods described above consists in finding, among the various designs produced by the brands, the one which is best suited to the morphology of the future wearer. A judgement of the end result is left to the customer but there is nothing to guarantee that the result will be ideal.

Another approach consists in first of all making models for (live) mannequins representing a target population. As there are perfect models for all the mannequins all that is needed is to determine the standard mannequin which is closest to the body profile of a person, subject to a few corrections, in order to be sure that there are models in the collection which will give the best results.

This approach is the one adopted in particular by the process disclosed in European application EP 0838167 in the name of the company New Lady, published on 29 Apr. 1998. However, as with the other methods already described, the approach remains partly theoretical and idealised. This latter method also does not correctly identify the specific problem posed by the fact that the garments are made by different manufacturers and that these manufacturers have criteria for judging "fit" which vary from one to another, which furthermore constitutes the image pertaining to their brands.

In the prior art a number of other methods and devices using scanning booths are also known.

American patent application US 2001/0030754 in the name of M. Spina et al, published on 18 Oct. 2001, describes a booth for acquiring the morphological data of a person, producing a standard 3D representation for a CAD system ("Computer-Aided Design"). Starting from this representation, standard measurements are generated which are stored in a file for subsequent use.

However, the measurements stored by this system do not take account of the size references actually used by garment manufacturers.

The technical problem of finding, among the standard manufacturers' ranges, the size of a garment which is best suited to the measurements of a particular person thus still remains.

Another booth for acquiring the measurements of a person with a view to synthesising a representation of this person wearing a ready-to-wear design is described in German patent application DE 19620144 filed by the Fachhochschule für Technik und Wirtschaft Berlin, published on 13 Nov. 1997.

The most suitable size is selected from the size references in a database, but again no account is taken of the use of these references among the manufacturers.

In the field of the manufacture of "made to measure" garments a CAD system is known which makes it possible to design a garment for a person by taking account of the measurements of said person and the characteristics of a garment design. This is the system described in American patent U.S. Pat. No. 5,495,568 published on 27 Feb. 1996 in the name of W. Beavin. In this system a made-to-measure 3D representation is personalised by using digital photographs of the person.

Reference movements, particularly the bending of the elbow, can be simulated while taking account of the physical parameters of the fabric used, thus making it possible to check that the garment fits properly.

However this latter system actually only relates to the manufacture of "made to measure" garments in which the garment is unique and precisely adapted to fit the measurements of the person, and not to the manufacture and/or provision of "individually dimensioned" ready-to-wear garments as envisaged by the present invention.

Thus, up till now, there has been no solution to the problem of the technical management of a limited number of standard sizes which are, moreover, different for each manufacturer.

GENERAL DESCRIPTION OF THE INVENTION

The present invention thus sets out to overcome the drawbacks of the methods known from the prior art of acquiring and managing morphological data of persons on a computer network, these data being intended for the manufacture and/or provision of individually dimensioned garments on a ready-to-wear basis by at least one of a number of manufacturers affiliated to a established network.

Specifically, it relates to a method of the kind already known consisting of:

establishing, in a preliminary step, a first database of human body profiles storing a set of standard data in a first computer system, acquiring the current data representing the morphology of these persons by means of a computerised acquisition system, in a subsequent step, selecting from these standard data the personal data which are closest to the current data of each of these persons.

The essential feature of the process according to the invention is that the personal data are selected, in a second computer system, from a second database in which the standard data are organised in ranges of sizes according to each of the manufacturers.

In the method for acquiring and managing morphological data of persons in a computer network according to the invention, the classification of the standard data in the second database additionally comprises:

a) parameters of predetermined categories, including location, b) general standard parameters comprising sex, age group, height, crotch height, and weight, c) standard three-dimensional parameters representing virtual standard mannequins in three dimensions corresponding to the standard data, d) two-dimensional standard parameters representing standard two-dimensional silhouettes corresponding to standard views of predetermined categories of the mannequins.

The categories of these standard views advantageously comprise a front view, a side view and a top view.

According to the invention the computerised system for acquiring the current data which is used in the method consists of a scanning booth. Preferably, these current data comprise current two-dimensional parameters representing current two-dimensional silhouettes and are extracted from the scanning data obtained from the scanning booth.

The invention is also notable in that the subsequent step of the method of acquiring and managing morphological data of persons in a computer network additionally comprises acquiring current general parameters relating to these persons, including in particular their sex, age group, ethnicity, height, crotch height and weight. The height, crotch height and weight are advantageously measured automatically, whereas the sex, age group and ethnicity are entered by each of the persons themselves.

Another essential feature of the method of acquiring and managing morphological data of persons in a computer network according to the invention is that target standard data are pre-selected from the standard data the general standard parameters of which correspond to the current general parameters defined above. It is thus deemed that the personal data to be used are the target standard data, the two-dimensional standard parameters of which are the best approximation of the current two-dimensional parameters.

Preferably, this best approximation is evaluated as a function of the tolerance levels on each of the standard two-dimensional parameters determined by the manufacturers.

Advantageously, the standard virtual mannequins corresponding to these personal data are displayed on a screen of a third computer system, preferably with an indication of the key measurements when viewed from any angle whatsoever.

Advantageously the personal data and general personal information, pertaining to each of the persons, are allocated a unique individual identification code at the command of each of the persons.

Advantageously, the method of acquiring and managing morphological data of persons in a computer network according to the invention comprises an additional step during which this identification code constitutes an access code to a set of data selected from a group comprising: general information data intended for the persons, the personal general data and information, the images of the garments selected from the manufacturers belonging to the established network in an earlier step, the favourite manufacturers of each of the persons and the corresponding sizes adapted to their morphologies, the identification codes of third persons.

Preferably, this set of data also includes, for each of the persons, a list of the manufacturers in the established network which have a size corresponding to his/her personal data.

Preferably also, the set of data to which the persons have access includes, for each of these persons, representations of the garments in the catalogues of the manufacturers on standard virtual mannequins corresponding to their personal data.

Most advantageously, this set of data is remotely accessible using at least one communications network and at least one suitable terminal. This network is preferably a data transport network using a protocol of the TCP/IP type, notably the Internet (TCP/IP is the acronym for "Transport Control Protocol/Internet Protocol").

Alternatively or simultaneously, this communications network is a mobile telephone network, particularly a third generation mobile telephone network. Advantage is taken of a mobile telephone network having a terminal locating service, notably in accordance with the IMPS standard (acronym for "Instant Messaging Presence Service"), the location making it possible to determine a number of sales outlets which offer the desired garments and which suit the preferences and size of the person using the terminal.

In certain situations, real-time location of this terminal is advantageously determined by means of a radiolocation network, particularly a satellite network.

A device for acquiring and managing the morphological data of persons on a computer network, adapted to performing the process according to the invention, for manufacturing and/or for providing individually dimensioned garments on a ready-to-wear basis, comprises the following, arranged in a known manner:

- a first communications network,
- a first computer system comprising first processing means, first memory means, a first database of human body profiles storing a set of standard data, and first means for selecting these standard data, the first computer system being connected to the first network by first communication means,
- a computerised acquisition system adapted to acquire the current data representing the morphology of the persons in question.

This device is notable in that it further comprises:

- a second computer system connected to the first network by second communication means, and comprising second processing means, second memory means and a second database. In this second base the standard data are linked with data representing the manufacturers and with data representing the ranges of sizes according to each of these manufacturers, and are selected by second selecting means,
- a third computer system comprising third processing means, third memory means and connected to the first network by third communication means transmitting the current data to the second selection means via second communication means for the purpose of selecting the personal data which are closest.

More precisely, the linked fields of this second database comprise fields representative of:

a) predetermined parameters of categories, including location,
b) standard general parameters including sex, age group, height, crotch height and weight,
c) standard three-dimensional parameters representing standard virtual three-dimension mannequins corresponding to the standard data,
d) standard two-dimensional parameters representing standard two-dimensional silhouettes corresponding to standard views of predetermined categories of virtual mannequins.

Preferably, the categories of the standard views in question comprise a front view, a side view and a top view.

Most advantageously, the acquisition system of the apparatus according to the invention consists of a scanning booth comprising:

- a vertical cell substantially in the shape of a prism or a straight cylinder, delimited by a floor, a ceiling and side panels. This cell is intended to accommodate inside it each person in a vertical position, in a predetermined zone of the floor, so that the person faces a first edge of the prism or a first generatrix of the cylinder,
- a first apparatus for taking digital photographs which is provided on this first edge of the prism or this first generatrix of the cylinder and is oriented towards the torso of the person in a first direction,
- a second apparatus for taking digital photographs, arranged on a second edge of the prism or a second generatrix of the cylinder, and directed towards the side of the torso of the person, in a second direction perpendicular to the first direction,
- a third apparatus for taking digital photographs, which is arranged underneath the ceiling and directed towards the predetermined zone of the floor where the person is standing.

Light sources provided with diffusing screens are preferably placed in the booth behind the object planes of each of the first, second and third photographic apparatus. The booth also advantageously comprises means for dispensing a blue or green body-hugging garment to be put on prior to any photographic session.

These characteristics of the booth are advantageous because the apparatus according to the invention comprises a module for extracting current two-dimensional silhouettes and for representing these silhouettes by current two-dimensional parameters executed by the third processing means of the third computer system on the basis of the signals obtained from the first, second and third photographic apparatus.

For the purpose of carrying out the process according to the invention the booth arrangement is advantageously completed by:

- an automatic scale located underneath the predetermined zone where the person stands,
- a laser ruler arranged underneath the ceiling and directed towards the predetermined zone,
- a crotch height measuring device.

Preferably the booth also includes:

- a keyboard and
- a monitor.

A module for capturing the current general parameters is preferably provided by the third processing means of the third computer system on the basis of the signals obtained from the scale, laser ruler, measuring device and keyboard.

Similarly, the following are advantageously provided by the third processing means on the third computer system:

- a module for inputting general personal information using the keyboard,
- a module for transmitting this general personal information to the second computer system.

A module for sending the personal data to the third computer system is also advantageously provided, which is run by the second processing means of the second computer system, together with other modules run by the third processing means of the third computer system:

- a module for receiving the personal data,
- a module for presenting the personal data and personal general information on the monitor in the booth,
- a module for validation by the person of their personal data and of general information relating to them.

Remarkably, the string of modules mentioned above is completed by:

- a module for assigning the personal data to the general personal information,
- a module for generating a unique identification code,
- a module for broadcasting this identification code at least to the third computer system, the assigning module, the generating module and the broadcasting module being run by the third processing means of the third computer system.

The advantages of this identification code will become apparent when the second computer system of the device for acquiring and managing morphological data of persons on a computer network according to the invention will additionally comprise a third data base storing the catalogues of garments available from the manufacturers in the form of collections of virtual designs, constituting with the second data base first sets of data pertaining to the manufacturers, and third means for selecting from these first sets of data.

With the same objective, the apparatus according to the invention advantageously also includes a fourth computer system comprising fourth processing means, fourth memory means, a fourth database storing second sets of data pertaining to the persons, and fourth means for selecting from the second sets of data. This fourth computer system is connected to the first network by fourth communication means. The fourth database preferably comprises the following files:
  records of the garments already purchased by the persons,
  identification codes for the persons,
  three-dimensional personal virtual mannequins corresponding to the persons,
  these persons' favourite manufacturers and the sizes corresponding to them,
  the real-time locations of the persons,
  financial details for the persons.

An additional feature of the apparatus for acquiring and managing morphological data of persons on a computer network according to the invention which seeks to exploit the advantages of the identification code for the persons is that the apparatus further comprises a fifth computer system which includes fifth processing means, fifth memory means, a fifth database storing third sets of data pertaining to a plurality of retailers, and fifth means for selecting from these third data sets. This fifth computer system is connected to the first network by fifth communication means. The fifth database comprises files on promotional offers, clothing ranges and the addresses of the retailers.

It is advantageous to have different methods of accessing the data. For this purpose, the apparatus according to the invention further comprises a sixth computer system which forms a first gateway between the first communication network and a second communication network, and at least one terminal adapted to communicate using the second communication network.

Preferably, the first network is a data transport network according to the TCP/IP protocol, notably the Internet, and the second network is a mobile telephone network, particularly a third generation mobile telephone network.

Most advantageously, the apparatus according to the invention further comprises a seventh computer system which constitutes a second gateway between the first or second communication network and a radiolocation network, the terminal being capable of being identified by the radiolocation network.

The radiolocation network in question is preferably a satellite network, notably the GPS network (English acronym for "Global Positioning System").

Alternatively, the radiolocation network is a service integrated in the second communication network, notably the IMPS service integrated in a mobile telephone network.

A plurality of copies of the terminal are advantageously connected to the fourth database and to the fifth database via the first gateway to the first communication network, and enable persons to view their personal virtual mannequins wearing the designs of the retailers which they have selected.

Similarly, the apparatus according to the invention further preferably comprises at least one eighth computer system connected via the first communication network to the fourth database and to the fifth database. This eighth system enables the persons to view their personal virtual mannequins wearing the designs of the retailers which they have selected.

The retailers will take advantage of the fact that the apparatus according to the invention also comprises at least one ninth computer system connected via the first communication network to the third database and to the fifth database. This ninth system enables the retailers to build up their garment ranges from the manufacturers' collections.

An additional advantage stems from the apparatus for acquiring and managing morphological data of persons on a computer network according to the invention when a plurality of microcomputers or mobile telephones connected to the network are used by a plurality of persons to order individually dimensioned garments on-line.

Preferably, at least one mobile telephone connected to the network is used as the payment terminal.

Another advantageous use of the apparatus for acquiring and managing morphological data of persons on a computer network according to the invention is that where a plurality of microcomputers connected to the network are used by a plurality of retailers to sell made-to-measure garments on-line.

These essential features make obvious to those skilled in the art the advantages conferred by the method and apparatus for acquiring and managing morphological data on a computer network according to the invention, as well as the use thereof, compared with the previous state of the art.

The detailed features of the invention are recited in the description that follows, in conjunction with the attached drawings. It should be noted that the sole purpose of these drawings is to illustrate the text of the description and that they in no way constitute any limitation to the scope of the invention.

DESCRIPTION OF THE PREFERRED EMBODIMENTS OF THE INVENTION

The method and apparatus for acquiring and managing, on a computer network, personal data intended for the clothing industry, according to the invention, are the components of a complex set of steps, operations, items of software and pieces of equipment which make it possible:
  for a manufacturer to have standard mannequins adapted to the requirements of his brand, whether these mannequins are virtual and computer-simulated, or real and made of fibreglass, notably a series of mannequins produced in the range of sizes of the brand, for manufacturers to display garment designs on virtual mannequins, to manage human body profiles in a general database and to organise them according to the size ranges of the garment manufacturers, to acquire profiles of persons with a view to manufacturing and/or selling garments intended for them, and to categorise these profiles in accordance with the same criteria as those used in the general database, to select, from the general database, the body profiles which are closest to those of the persons, to construct virtual mannequins representing these persons, for these persons to access, through a terminal connected to a data network and using their own access code, their body profiles and other personal data, and to view the garments of their choice being worn by their representative mannequins, for these persons to use a mobile telephone as their terminal, for these persons to determine the location where they can buy the garment of their choice.

Figure 1:
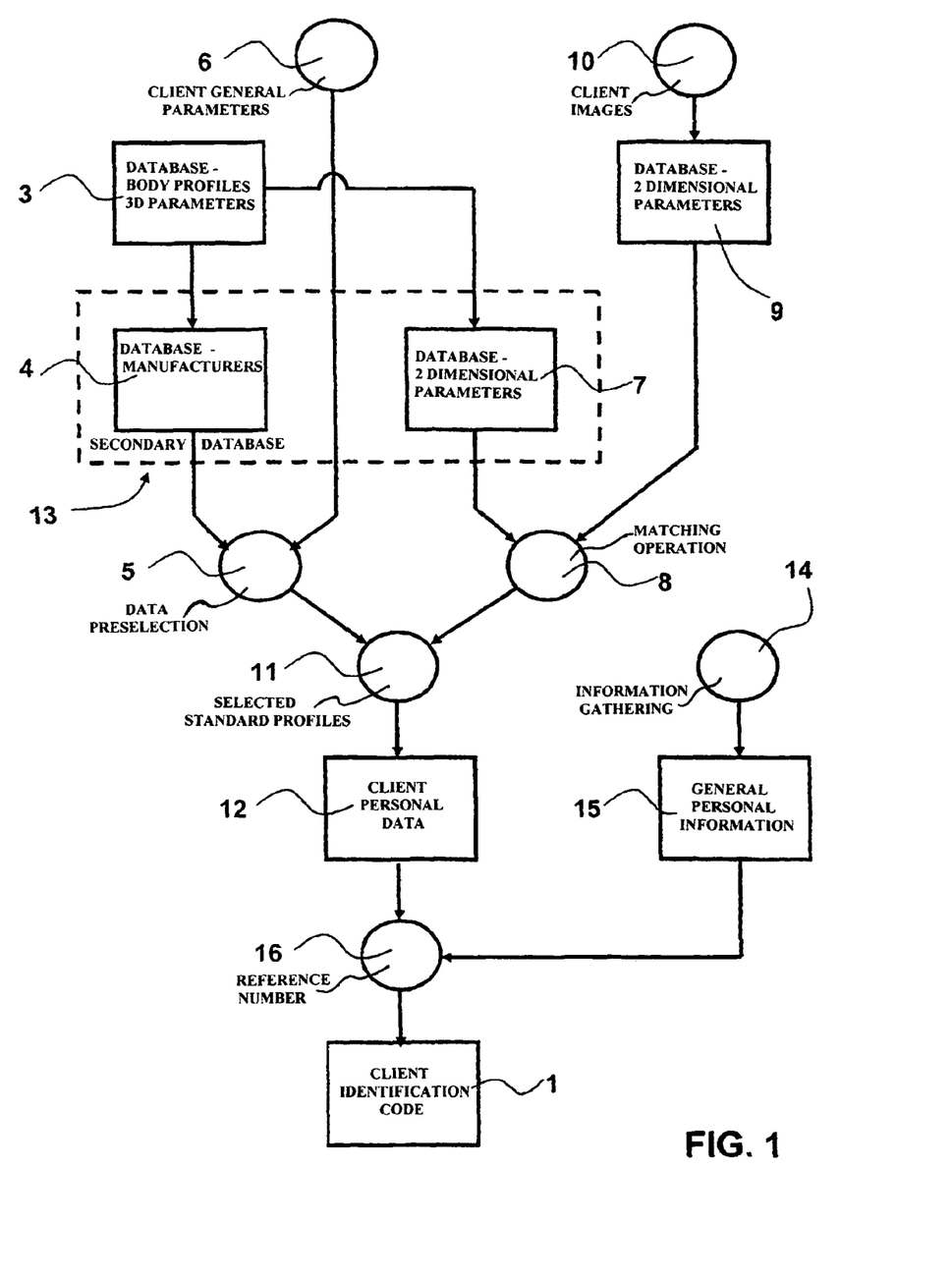
FIG. 1 is a synoptic diagram showing the interconnection of the different steps of the process according to the invention, resulting in the creation of an identification code for the customer.
Figure 2:
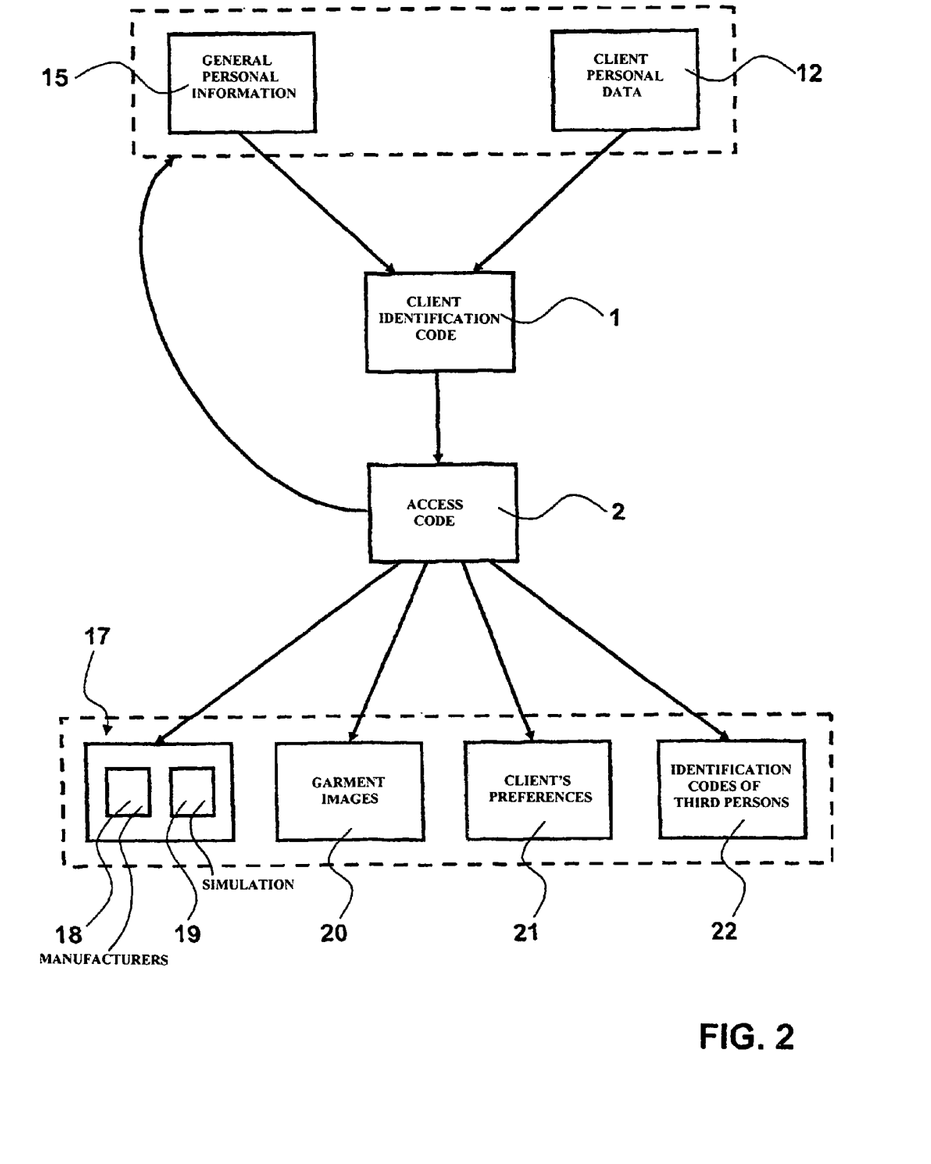
FIG. 2 schematically shows all the data which the customer is able to access using their identification code.

FIG. 1 shows the linking together of the different elements of the system, which results in the generation of an identification code for the client 1, which also acts as an access code 2 to a set of data and services, as schematically shown in FIG. 2.

In a preliminary step of the process according to the invention, a first database 3 of human body profiles has been set up. The setting up of this database 3 and the organisation of the standard data which it contains are described in detail by the Applicant in an earlier International patent application published under number WO 02/093449 on 21 Nov. 2002.

It is a database 3 into which morphological data obtained from three-dimensional scanning of the bodies of either a target population or of live mannequins regarded as representative of a given target population have been imported and processed. These morphological data have been organised and stored according to key predefined criteria such as:

affiliation criteria: sex, age group, ethnicity, volumetric criteria: weight, body mass index, size (bust/chest, waist, hips), dimensional criteria: height and crotch height, angular criteria: shoulder slope, attitude.

To summarise, therefore, base 3 consists of standard data associated with three-dimensional standard virtual mannequins.

For his own purposes, a manufacturer reorganises these standard data according to the size ranges 4 which are characteristic of his brand. The manufacturer also adds other data, such as the location of his shops or, in general, information as to his distribution channels.

The general database 3 of body profiles makes it possible to select the standard profile which is closest to the particular profile of a person, which is obtained using a light scanning booth, i.e. one in which the number of measuring points is relatively low, as described in the earlier application mentioned above.

The supplementary organisation of the general database 3 according to the manufacturers' size ranges 4 makes it possible to select the closest standard profile that actually exists in the range of a given manufacturer.

A preselection 5 of target standard data is carried out starting from some general parameters 6 provided by the person in question. Eventually, a preselection on the basis of predetermined categories will advantageously be carried out by the system.

The location is an important piece of information among the predetermined categories. Just as it is pointless to select, from the database 3, a standard profile which does not correspond to the size ranges of a particular manufacturer, it is not practical to have a standard profile corresponding to garment sizes that would only be available at places remote from the location of the person.

The general filtering parameters 6 are preferably: sex, age group, height, the characteristic elements of the commercial name for the size, the crotch height and weight. Some of these parameters are input manually by the person, or obtained automatically by measuring means, or extracted from databases, as will be explained in connection with FIGS. 2, 3, 5 and 6.

In order to simplify the selection of the standard profiles as a function of certain volumetric criteria such as size, dimensional criteria and angular criteria, the morphological data of the general database 3 are classified according to standard two-dimensional parameters 7 associated with the standard three-dimensional parameters representative of the virtual mannequins.

These standard two-dimensional parameters 7 are extracted from the standard three-dimensional parameters 3 by planar projections corresponding to front views, side views and top views of the mannequins. They are matched 8 to the corresponding current two-dimensional parameters 9 extracted from the front, side and top images 10 of the subject during an operation 8 the principle of which will be explained in connection with FIGS. 4a, 4b and 4c.

The images 10 of the person are obtained by a specific subassembly of the apparatus according to the invention which will be described in connection with FIGS. 3a and 3b.

The particular standard profiles 11 selected from among the target data, the standard two-dimensional parameters 7 of which are the best approximation of the current two-dimensional parameters 9, constitute the personal data 12 of the subject.

These data 12 thus result from a join, made in the secondary database 13 of human body profiles organised according to the size ranges of the manufacturers 4 and according to the two-dimensional criteria 7, between the entries selected according to the general parameters 6 and the entries selected according to the two-dimensional parameters 9.

These personal data 12 are submitted to the person for approval, on a computer screen, together with the image of the corresponding virtual mannequin.

During the stage of assembling the personal data 12 as described above, other information is gathered 14. In particular, general personal information 15 relating to the consumer, such as his/her name, occupation, address, telephone numbers, both fixed and mobile, mailing address, bank details and valid credit cards.

The whole of the personal data 12 and this general personal information 15, once approved by the subject, is referenced 16 by a single number which represents the customer's identification code 1.

Conversely, this identification code 1 is used by the system as an access code 2, as schematically indicated in FIG. 2, giving access to the personal data 12, to the general personal information 15, to general information data 17 intended for the person, and to the information essentially developed by the system during its use.

The general information data are, in particular, the list 18 of manufacturers belonging to the network who have garments in a size corresponding to the person's measurements. They are also data 19 which make it possible to simulate the wearing, by the person, of the garments from the manufacturers' catalogues, using his/her virtual mannequin.

The system retains and displays:
- the images 20 of the garments already purchased from the manufacturers,
- information 21 as to the person's preferences, notably their favourite manufacturers, and the sizes which have proved suitable from said manufacturer,
- the identification codes 22 of third persons, friends and family.

Figure 3A:
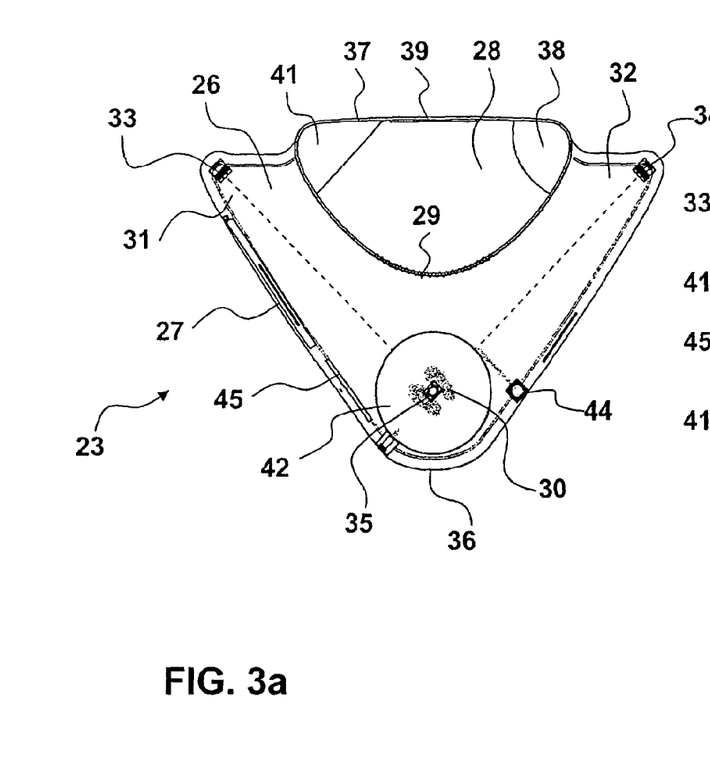
FIGS. 3a and 3b show, respectively, a top view and a front view of the scanning booth suitable for carrying out the process according to the invention.
Figure 3B:
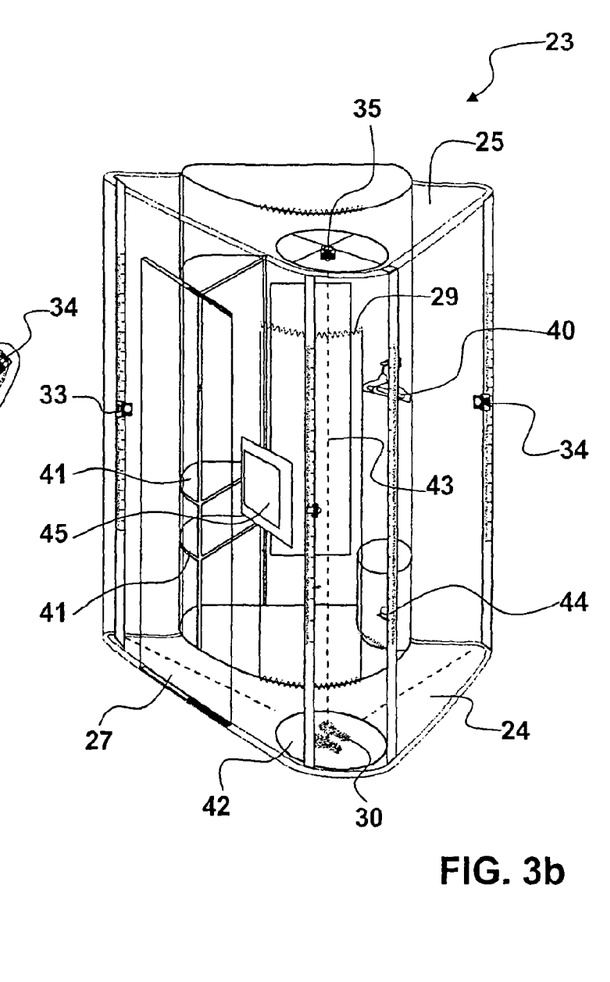

The measurements and data 6, 10, 14 needed to develop the identification code 1 are acquired by means of the subassembly, resembling a photographic booth 23, shown in FIGS. 3*a* and 3*b*.

This booth 23 makes it possible to take digital photographs of the contour of the customer's torso viewed from in front, from the side and from above. It is installed in shopping areas accessible to the public. In order to enter the booth 23 the customer has to make a payment, similar to that which is needed to use the public toilets known as "Sanisettes" in France. The central bodies that control and manage the booths through a computer network are liable to intervene if help is needed. The customers update their personal profiles using these booths 23 if their body size or height changes, if they gain weight, lose weight or grow in height (children).

A booth 23 in one particular embodiment is in the form of a prismatic cell the floor 24 and ceiling 25 of which are substantially shaped like a right-angled isosceles triangle, with sides about 2.5 m long. The interior is designed to accommodate a person in a first compartment 26, which the person enters through a sliding door 27, and in a second compartment 28 separated from the first by a barrier 29.

The first compartment 26 is equipped to take the measurements and personal data of the person. The zone on the floor 24 corresponding to the right-angle of the triangle comprises marks 30 that indicate the optimum placement for the feet, in the centre of a circle about 75 cm in diameter, which has to be adhered to during the measurements. The person maintaining this position has to face a first corner 31 of the booth, leaving the second corner 32 on his/her right.

Two digital cameras 33, 34 are placed, one in the first corner 31 of the booth 23 and the other in the second corner 32, and capture in their fields of view a front view and a side view, respectively, of the person's torso. A third digital camera 35 is attached to the ceiling 25, vertically aligned with the marks 30 for the feet, and takes an image of the person from above. A diffusing screen 36 placed on the panels of the compartment 26 adjacent to the place where the person is standing, and illuminated by light sources, makes it possible to take backlit photographs so as to make it easier for the computerised acquisition system to extract silhouettes from the images.

To the same end, the person wears a body-hugging outfit, blue or green in colour, made of a stretch material such as jersey, with a high neck and extending to mid-thigh, which is put on in the second compartment 28. This compartment 28 is in the form of a semi-cylinder set aside within the booth 23, the planar diametric panel 37 coinciding with the widest panel in the booth 23. It comprises fittings allowing the person to change in comfort, particularly a seat 38, a mirror 39, coat hangers 40. Different sizes of body-hugging outfits are provided on shelves 41.

The scanning space 26 also comprises an automatic weighing scale 42 located level with the marks 30 for the feet, a laser ruler 43 for measuring the person's height, and a sensor for detecting the crotch height 44.

Optionally the booth 23 may have a bioelectric impedance sensor for analysing the proportion of body fat and thereby acquiring additional data relating to the person.

A touch-screen 45 allows the person to input and display data, such as his/her gender, age and ethnicity, and other general personal information, particularly his/her name, occupation, address, as mentioned previously.

As has already been explained, the data pertaining to the body profile of a person, which have been generated by the acquisition system of the booth 23 from the different sensors 33, 34, 35, 42, 44 and 45, serve to select 11, from the manufacturers' database 13 on the network, the standard virtual mannequins 3 which best correspond to this profile.

This manufacturers' database 13 is a secondary database derived from the general database 3 of human body profiles which is the subject of the patent application WO 02/093449 by the same applicant, mentioned previously.

Thus the idea is essentially to match the data corresponding to three-dimensional views (known as "3D views") with data obtained from two-dimensional views (known as "2D views"). The process carried out in order to do this is a complex process which will be better understood from the following explanations in conjunction with FIGS. 4*a*, 4*b* and 4*c*, which relate, by way of example, to taking the measurements of a female subject.

The different profiles of consumers are targeted by garment manufacturers on the network through the so-called "red line" system currently used in the technique of computer-aided design of garments. The "red lines" correspond to horizontal and vertical section planes and make it possible to design and construct a garment from the body of a mannequin. The "red line" system is also linked to the coordinates of the key points for classifying human profiles as taught by the application WO 02/093449. Even if the "red lines" are defined on a 3D model, as is clearly shown in FIGS. 4*a*, 4*b* and 4*c*, the position of certain key measurements, known as "block measurement lines" is defined on the basis of the front, back and side projections.

Figure 4A:
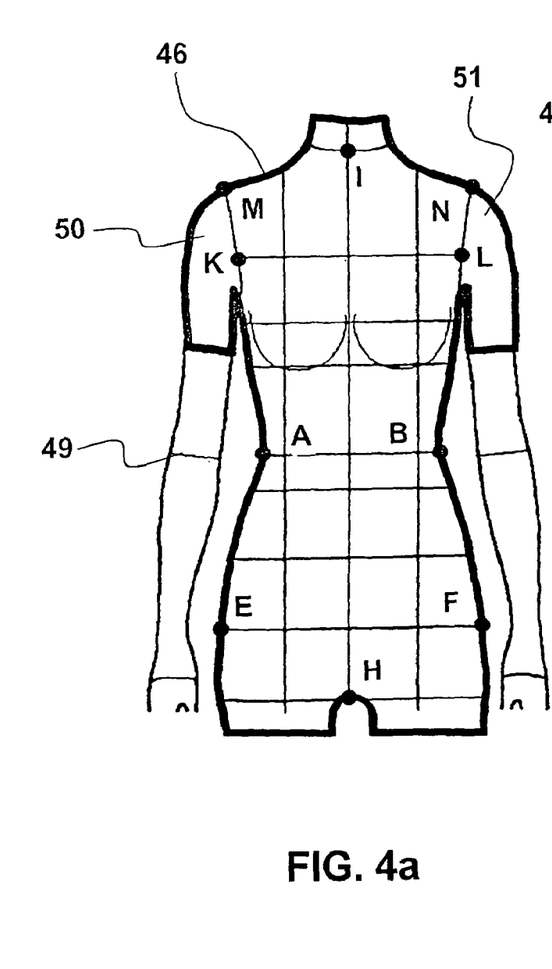
FIGS. 4a, 4b and 4c show the two-dimensional parameters taken into account on, respectively, a front view, a side view and a top view, of the customer's torso.
Figure 4B:
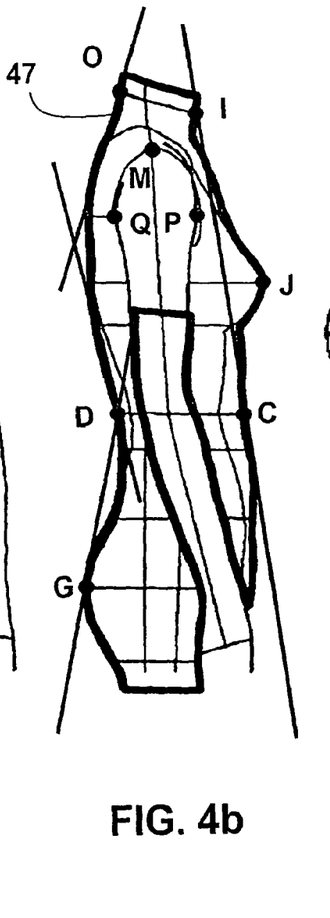
Figure 4C:
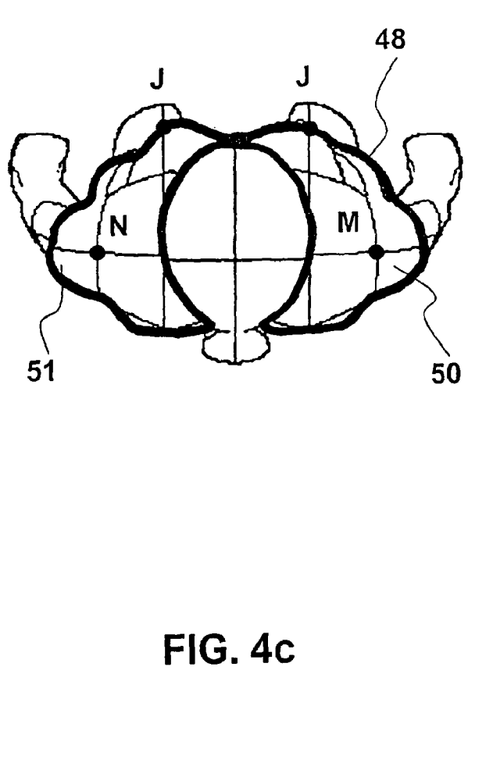

Analysis of the silhouette, i.e. of the contours 46, 47, 48 of the torso extracted from the 2D front, side and top views taken by the cameras 33, 34, 35, actually provides information which is important for the characterisation of human profiles. This analysis enables the key points to be positioned on the silhouette and from this allows the measurement lines to be deduced. Certain angles and shapes are essential for evaluating the "fit". Thus, using tangents, diameters and the top view to obtain additional criteria, the "red lines" define and describe the configuration and posture and provide particular information as to the shape of the body (protruding scapula, lumbar curvature, thoracic curvature, neck angle, pelvis angle).

The photographic angles should be comparable with the direction of the planar projections of the three-dimensional morphologies extracted from the database. The marks 30 on the ground for placing the feet, for this purpose, cause the customer to adopt the best possible position in the booth while the pictures are being taken. The natural defects of asymmetry of the body in the photos are evaluated and analysed using the position of the key points on the silhouette before determining the position of the measurement lines, as indicated by the subsequent phases of the analysis of the 2D images with a view to correcting them and in order to determine the key measurements:

a) the waist is generally the narrowest part of the trunk: in the front view (FIG. 4*a*) the left and right key points A and B, respectively, are easily found. The average height between these two points A, B defines the waist height and refers to the side view (FIG. 4b) to define the "front waist" and "back waist" points C and D, respectively, b) if the human body is regarded as a set of slices superimposed on one another the slice with the largest surface area in the pelvic zone corresponds to the hip girth.

Generally, the front photo (FIG. 4a) is sufficient to determine the position of the hip girth due to the protuberance E, F of the greater trochanter (joint between the femur and the coxal bone). However, the distribution of fat and muscle in the buttocks plays a part in determining the position of the hip girth. The front view (FIG. 4a) and side view (FIG. 4b) will therefore be used to determine the precise position E, F, G, c) the crotch reference point is the lowest point on the trunk H (along the line of the "centre front" HI and "centre back"). The blue or dark green body-hugging outfit helps to mark the crotch height and the crotch measuring tool 44 determines the crotch height even where the fat deposits on the inside of the thighs in generously built people cause the thighs to come into contact with each other, d) it will be noted that the elbow 49 is normally positioned at the same height as the waist AB, e) in the side view (FIG. 4b), the bust reference point J corresponds to the largest section of the top part of the trunk, f) the inflection point I on the shoulders 50, 51 corresponds to the "hanging point", g) in the front view (FIG. 4a) the tangents to the body passing through the armholes K, L define the "shoulder reference" points M, N, h) the intersection of the linear regressions running along the shape of the two shoulders 50, 51 corresponds to the "back neck reference point" O, i) in the side view (FIG. 4b), the tangent to the line formed by the nape of the neck determines the neck angle IO (perpendicular to said tangent), j) on the side view, once again, the straight line connecting the "front neck point" I to the "front waist" C and the line connecting the "back neck point" O to the "back waist" D provide information as to the shape and attitude of the body, k) the four lines at a tangent to the level of the pelvis G at the "back waist" point D, at the "back neck point" O and "front waist" C define the angles of the spinal column which provide information essential to the designer (shape, posture, protruding scapula, lumbar curvature, thoracic curvature, neck angle, pelvis angle), l) the front and back underarm points P and Q, respectively, define the "cross-front measurement" and "cross back measurement". The ratio of "cross front measurement" to "cross back measurement" is therefore established on the basis of the front and side views as well as the attitude (relaxed, normal or upright) with the aid of the additional information provided by the top view (FIG. 4c).

On the models in the database of human profiles 3, the "red lines" directly give the position of the key points for all the planar projections corresponding to the front, side and top views.

By merging the key points extracted from the 2D views and those of the 3D models, while taking account of the specific tolerances generally allowed by the garment manufacturers in the network, the apparatus according to the invention is thus capable of selecting the virtual mannequin which best corresponds to the measurements of a person.

The results of the processing are displayed to the person on the screen 45 of the booth 23. After approval 16 by the person, the results are safeguarded, as explained previously, in a reference record indexed by a unique identification code 1.

Figure 5:
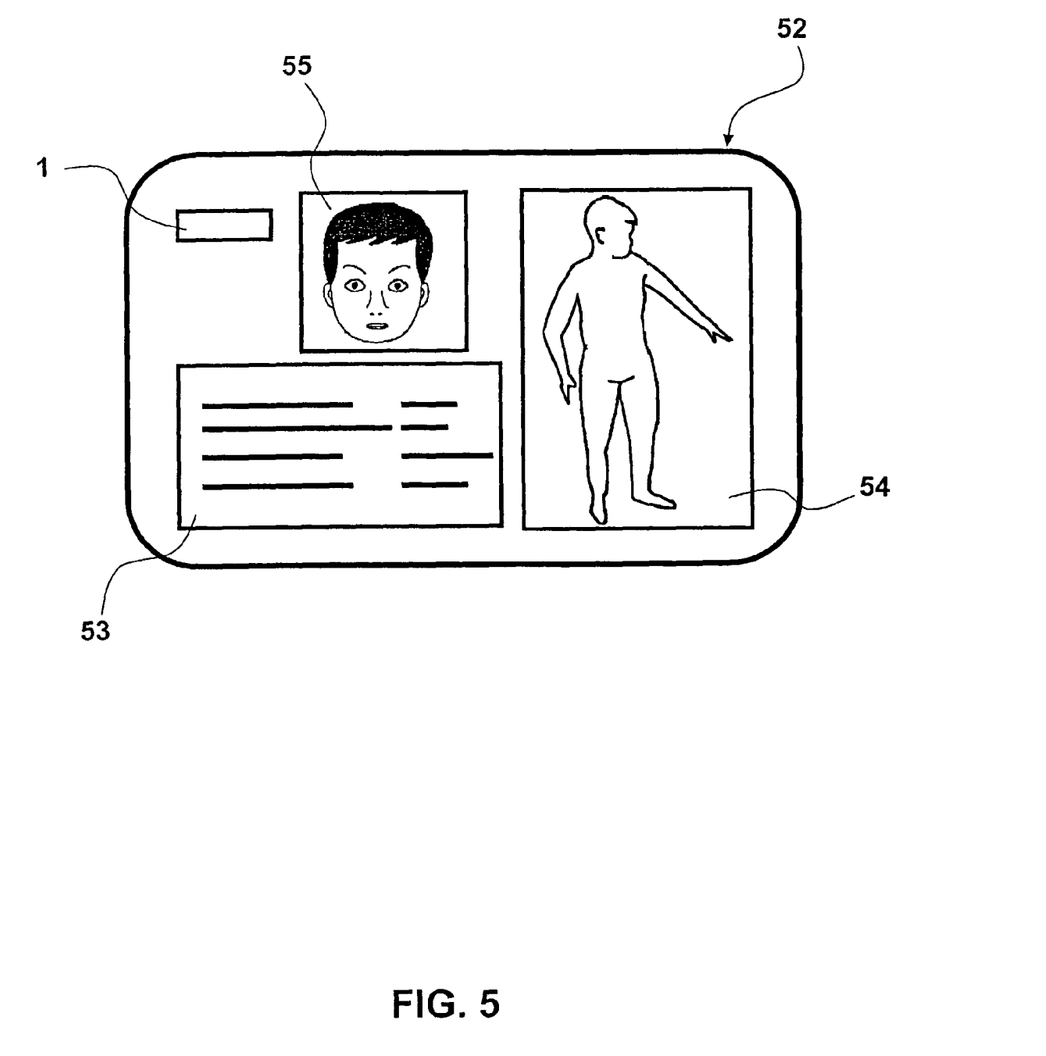
FIG. 5 shows an information carrier suitable for carrying out the process according to the invention.

All or part of this record is advantageously stored, parallel to full archiving in the databases distributed throughout the system, on an information support 52 of the "smart card" or "magnetic card" type edited by the managers of the system and assigned to the person. Such a carrier is shown in FIG. 5.

The front of the card 52 is printed with some of the information contained in its memory. In particular, the identification code 1 for the customer, his/her measurements 53, a representation 54 of his/her virtual mannequin and a picture 55 of the "identity photograph" type corresponding to his/her facial type.

Figure 6:
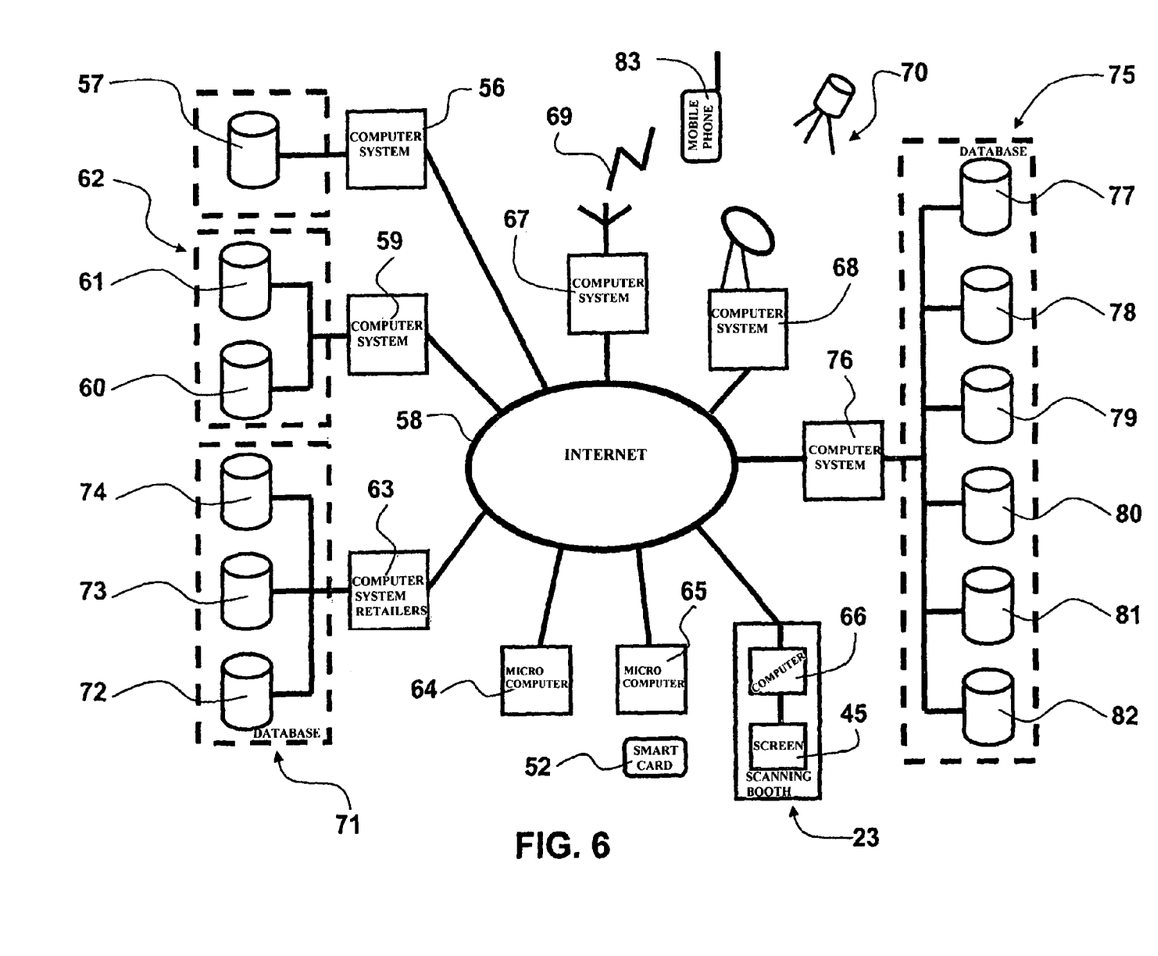
FIG. 6 is a general diagram of all the elements that make up an apparatus suitable for carrying out the process according to the invention.

The booth 23 in which the measurements of the customer are taken and the "measurement" card 52 are to some extent the first and last components of the apparatus according to the invention, the structural architecture of which is shown in FIG. 6.

A first computer system 56 is used to manage the general database of human body profiles 57. This is a multi-media relational database, i.e. one in which certain fields contain pointers to external objects, notably the files representing 3D virtual mannequins, and planar projections. One component of the system 56 is a server connected to the Internet 58 enabling remote customers to select data using a search engine and download the data.

These downloaded data enable the manufacturers on the network to build up, on their computer systems 59 connected to the Internet 58, secondary databases 60 of human profiles arranged in accordance with their names, their target customer groups and their ranges of sizes. Using the same system 59, the manufacturers manage their collections of virtual garments 61.

All these data 62 pertaining to the manufacturers is made accessible through the Internet 58 by means of a "server" type software for the computerised systems of the retailers 63, 64, the customers 65, and other components of the apparatus according to the invention, notably the computer systems 66 of the scanning booths 23 and the gateways 67, 68 to the mobile telephone networks 69 and radiolocation networks 70.

On their specific Internet sites 63 the retailers provide online information 71 of interest to the buyers such as the addresses 72 of their retail outlets, the ranges 73 of garments available in these outlets, according to the brands and sizes, and promotional offers 74.

The Internet sites 63 of the retailers are collective sites which combine a number of retailers; each of the retailers in particular has a microcomputer 64 connected to the Internet 58 with which he can access the site of the manufacturers 59 in order to select the garment designs 60 which he would like to sell and present in the space 73, 74 reserved for him on the collective site 63.

All the data 75 pertaining to the customers is stored in one or more servers 76 connected to the Internet 58. These data are divided into a number of files which are modified or accessible by the different elements of application software of the system.

The file 77 contains the identification codes for the persons generated by the phase of acquisition of the measurements in the booths 23. This file 77 is used as an index enabling consumers to access their measurements and all their other personal data stored in the other files, notably the file 78 containing their specific virtual mannequins, the file 79 containing their wardrobes or the file 80 containing their bank details.

Another file 81 contains the customer preferences. This file 81 is produced by the system as a function of purchases already made by the customers. A file 82 which is constantly updated in connection with the radiolocation server 68 contains the location of the consumers at a particular moment.

This last file 82 enables the system, in connection with the files of the addresses 72 and ranges 73 available from the retailers, on the one hand, the file of virtual mannequins 78 and the file of customer preferences 81, on the other hand, to suggest to any person registered with the system and having a mobile telephone terminal 83 with access to the Internet 58, in WAP mode (acronym for "Wireless Access Protocol"), for example, a set of garment designs in accordance with his/her tastes and size, which are available in stores close to the place where he/she currently is. His/her virtual model wearing this selection of garments is displayed on the screen of his/her mobile telephone. This telephone is advantageously used as a secure payment terminal at the moment when the sale is concluded in the retailer's shop.

The customer thus finds, in the method and apparatus for acquiring and managing morphological data of persons on a computer network according to the invention, in a manner which is totally transparent to him/her, a solution for purchasing garments which fit his/her measurements and his/her profile while being ready-to-wear.

Those involved in the supply chain for the garment, be they manufacturers or retailers, will also readily identify all the advantages which they can take from the method and apparatus according to the invention, either in terms of reducing manufacturing, distribution or marketing costs or in terms of quality and image: high technology in the service of fashion is a concept which is obviously attractive for a demanding modern clientele.

The booths make it possible to acquire continuously new morphological data relating to the populations which frequent them: a by no means insignificant advantageous by-product of the system is hence the development of a statistical image which is much more refined than that obtained by national measuring campaigns which are carried out only on small samples and in any case are extremely infrequent, as several decades may expire between two such campaigns.

As will be apparent, the invention is not restricted simply to the preferred embodiments described above.

On the contrary, it includes all the possible alternative embodiments. In particular, the computer expert will readily replace the computer systems described by way of example with equipment having the same functions; the general architecture diagrammatically shown in FIG. 6 will be developed and made more specific, as necessary. Obviously, these replacements and developments would not depart from the scope of the present invention as defined by the claims that follows.

The invention claimed is:

1. Method for acquiring and managing morphological data of persons on a computer network, these morphological data being intended for the manufacture and/or provision, as ready-to-wear, of individually dimensioned garments made by at least one of a number of manufacturers, said method being of the kind comprising establishing, in the course of a preliminary step, a first database (3) of human body profiles storing a set of standard data in a first computer system (56) and, in a subsequent step, acquiring (6, 10) the current data representing the morphology of these persons by means of a computerised acquisition system (23, 45, 66) and selecting (5, 8) from these standard data the personal data which are closest to the current data (6, 9) of each of these persons, characterised in that the personal data (12) are selected in a second computer system (59), from a second database (4, 7) in which the standard data are organised in ranges of sizes according to each of the manufacturers, characterised in that the classification of said standard data in said second database (4, 7) further comprises two-dimensional standard parameters (7) representing standard two-dimensional silhouettes corresponding to standard views of predetermined categories of the mannequins, and further characterized in that the categories of said standard views comprise a front view, a side view and a top view.

2. Method for acquiring and managing morphological data of persons on a computer network according to claim 1, characterised in that the classification of said standard data in said second database (4, 7) further comprises:
   a) parameters of predetermined categories, including location,
   b) general standard parameters (4) comprising sex, age group, height, crotch height, and weight,
   c) and standard three-dimensional parameters representing three-dimensional virtual standard mannequins corresponding to the standard data.

3. Method for acquiring and managing morphological data of persons on a computer network according to claim 1, characterised in that said computerised system (23, 45, 66) for acquiring the current data includes a scanning booth (23).

4. Method for acquiring and managing morphological data of persons on a computer network according to claim 3, characterised in that said current data comprise current two-dimensional parameters (9) representing current two-dimensional silhouettes and are extracted from the scanning data (10) obtained from the scanning booth (23).

5. Method for acquiring and managing morphological data of persons on a computer network according to claim 1, characterised in that said subsequent step additionally comprises acquiring current general parameters (6) relating to said persons, including in particular their sex, age group, ethnicity, height, crotch height and weight, by means of said acquisition system (23, 45, 66).

6. Method for acquiring and managing morphological data of persons on a computer network according to claim 5, characterised in that the height, crotch height and weight are measured automatically.

7. Method for acquiring and managing morphological data of persons on a computer network according to claim 5, characterised in that the sex, age group and ethnicity are entered by each of the persons themselves.

8. Method for acquiring and managing morphological data of persons on a computer network according to claim 5, characterised in that target standard data are pre-selected (5) on said second computer system (59) from the standard data the general standard parameters (4) of which correspond to said current general parameters (6).

9. Method for acquiring and managing morphological data of persons on a computer network according to claim 8, characterised in that said personal data (12) are said target standard data, the two-dimensional standard parameters (7) of which are the best approximation of said current two-dimensional parameters (9).

10. Method for acquiring and managing morphological data of persons on a computer network according to claim 9, characterised in that said best approximation is evaluated as a function of tolerance levels on each of the standard two-dimensional parameters (7) determined by said manufacturers.

11. Method for acquiring and managing morphological data of persons on a computer network according to claim 9, characterised in that said standard virtual mannequins corresponding to said personal data (12) are displayed on a screen (45) of a third computer system (66).

12. Apparatus for acquiring and managing the morphological data of persons on a computer network, suitable for carrying out the method according to claim 1, said morphological data being intended for the manufacture and/or provision of individually dimensioned garments by at least one of a plurality of manufacturers, said apparatus comprising:

a first communication network (58), a first computer system (56) comprising first processing means, first memory means, a first database (57) of human body profiles storing a set of standard data, and first means for selecting from said standard data, said first computer system (56) being connected to said first network (58) by first communication means, a computerised acquisition system (23, 45, 66) adapted to acquire the current data (6, 9) representing the morphology of said persons, characterised in that it further comprises:

a second computer system (59) connected to said first network (58) by second communication means, and comprising second processing means, second memory means and a second database (60) in which said standard data are linked with data representing said manufacturers and with data representing the ranges of sizes according to each of said manufacturers, and are selected by second selecting means, a third computer system (66) comprising third processing means, third memory means and connected to said first network (58) by third communication means transmitting said current data (6, 9) to said second selection means via said second communication means for the purpose of selecting the personal data (12) which are closest.

13. Apparatus for acquiring and managing the morphological data of persons on a computer network according to claim 12, characterised in that the linked fields of said second database (59) comprise fields representative of:

a) predetermined parameters of categories, including location, b) standard general parameters (4) including sex, age group, height, crotch height and weight, c) standard three-dimensional parameters representing standard virtual three-dimensional mannequins corresponding to said standard data, d) standard two-dimensional parameters (7) representing standard two-dimensional silhouettes corresponding to standard views of predetermined categories of said mannequins.

14. Apparatus for acquiring and managing the morphological data of persons on a computer network according to claim 13, characterised in that the categories of said standard views comprise a front view, a side view and a top view.

15. Apparatus for acquiring and managing the morphological data of persons on a computer network according to claim 13, characterised in that said acquisition system (23, 45, 66) includes a scanning booth (23) comprising:

a vertical cell substantially in the shape of a prism or a straight cylinder, delimited by a floor (24), a ceiling (25) and side panels, said cell being intended to accommodate inside it each of said persons in a vertical position, in a predetermined zone (30) of said floor (24), facing a first edge (31) of said prism or a first generatrix of said cylinder, a first apparatus for taking digital photographs (33) which is provided on said first edge (31) of the prism or said first generatrix of the cylinder and is oriented towards the torso of said person in a first direction, a second apparatus for taking digital photographs (34), arranged on a second edge (32) of said prism or a second generatrix of said cylinder, and directed towards the side of the torso of said person, in a second direction perpendicular to said first direction, a third apparatus for taking digital photographs (35), which is arranged underneath said ceiling (25) and directed towards said predetermined zone (30) of the floor where the person is standing.

16. Apparatus for acquiring and managing the morphological data of persons according to claim 15, characterised in that said booth (23) also comprises means (41) for dispensing a blue or green body-hugging garment.

17. Apparatus for acquiring and managing the morphological data of persons on a computer network according to claim 15, characterised in that it comprises a module for extracting current two-dimensional silhouettes and for representing said silhouettes by current two-dimensional parameters executed by said third processing means of said third computer system (66) on the basis of the signals obtained from said first, second and third photographic apparatus (33, 34, 35).

18. Apparatus for acquiring and managing the morphological data of persons according to claim 15, characterised in that said booth (23) also comprises:

an automatic weighing scale (42) located underneath said predetermined zone (30) on the floor, a laser ruler (43) arranged underneath said ceiling (25) and directed towards said predetermined zone (30), a crotch height measuring device sensor (44).

19. Apparatus for acquiring and managing the morphological data of persons on a computer network according to claim 18, characterised in that said booth (23) also includes:

a keyboard (45) and a monitor (45).

20. Method for acquiring and managing morphological data of persons on a computer network, these morphological data being intended for the manufacture and/or provision, as ready-to-wear, of individually dimensioned garments made by at least one of a number of manufacturers, said method being of the kind comprising establishing, in the course of a preliminary step, a first database (3) of human body profiles storing a set of standard data in a first computer system (56) and, in a subsequent step, acquiring (6, 10) the current data representing the morphology of these persons by means of a computerised acquisition system (23, 45, 66) and selecting (5, 8) from these standard data the personal data which are closest to the current data (6, 9) of each of these persons, characterised in that the personal data (12) are selected in a second computer system (59), from a second database (4, 7) in which the standard data are organised in ranges of sizes according to each of the manufacturers, characterised in that the classification of said standard data in said second data-base (4, 7) further comprises:

a) parameters of predetermined categories, including location, b) general standard parameters (4) comprising sex, age group, height, crotch height, and weight, c) and standard three-dimensional parameters representing three-dimensional virtual standard mannequins corresponding to the standard data, d) two-dimensional standard parameters (7) representing standard two-dimensional silhouettes corresponding to standard views of predetermined categories of the mannequins, and characterised in that the categories of said standard views comprise a front view, a side view and a top view.

* * * * *